United States Patent
Markin et al.

(10) Patent No.: US 10,956,744 B2
(45) Date of Patent: Mar. 23, 2021

(54) METHODS FOR CATEGORIZING INPUT IMAGES FOR USE E.G. AS A GATEWAY TO AUTHENTICATION SYSTEMS

(71) Applicant: AU10TIX LIMITED, Hod Hasharon (IL)

(72) Inventors: Sergey Markin, Herzeliya (IL); Benjamin Neeman, Raanana (IL); Ron Atzmon, Tel Aviv (IL)

(73) Assignee: AU10TIX LTD., Hod Hasharon (IL)

( * ) Notice: Subject to any disclaimer, the term of this patent is extended or adjusted under 35 U.S.C. 154(b) by 88 days.

(21) Appl. No.: 15/554,692

(22) PCT Filed: Feb. 2, 2016

(86) PCT No.: PCT/IL2016/050112
§ 371 (c)(1),
(2) Date: Aug. 30, 2017

(87) PCT Pub. No.: WO2016/139653
PCT Pub. Date: Sep. 9, 2016

(65) Prior Publication Data
US 2018/0253602 A1    Sep. 6, 2018

(30) Foreign Application Priority Data

Mar. 4, 2015  (IL) .......................... 237548

(51) Int. Cl.
*G06K 9/00* (2006.01)
*G06F 16/583* (2019.01)
*G06K 9/46* (2006.01)

(52) U.S. Cl.
CPC ....... *G06K 9/00684* (2013.01); *G06F 16/583* (2019.01); *G06K 9/00442* (2013.01);
(Continued)

(58) Field of Classification Search
CPC ......... A63F 13/12; B42D 25/30; G06F 3/048; G06F 3/121; G06F 3/0482;
(Continued)

(56) References Cited

U.S. PATENT DOCUMENTS 5,465,167 A * 11/1995 Cooper .............. H04N 1/00366
358/402
5,642,288 A * 6/1997 Leung ................ G06K 9/00463
382/112

(Continued)

FOREIGN PATENT DOCUMENTS

EP          0 385 009 A1    9/1990
WO       2013/014667 A2    1/2013

OTHER PUBLICATIONS

"Connected-component labeling," Wikipedia, Oct. 3, 2014, [https://en.wikipedia.org/w/index.php?title=Connected-component_labeling&oldid=628092153].

(Continued)

*Primary Examiner* — Xuemei G Chen
(74) *Attorney, Agent, or Firm* — Browdy and Neimark, PLLC

(57) ABSTRACT

A scanned image authentication system employing at least one image authentication station which is unable to process scanned images which do not belong to at least one individual scanned image category, the system comprising a gateway image processor operative for on-line filtering of an incoming scanned image to determine whether or not the incoming scanned image belongs to the scanned image category, and a computer-implemented interface operative to transmit each individual scanned image to the at least one image authentication station only if the gateway image
(Continued)

610: Use a gateway image processor for on-line filtering (e.g. as per suitable operations from method of Figs. 1a – 1b) of incoming scanned images to determine whether or not the incoming scanned image belongs to a scanned image category characterized in that at least one image authentication station is unable to process scanned images which do not belong to that category

↓

620: transmit each individual scanned image to the image authentication station/s only if gateway image processor determines that individual image belongs to that category processor has determined that the individual scanned image belongs to the at least one individual scanned image category.

32 Claims, 7 Drawing Sheets

(52) U.S. Cl.
CPC ........... *G06K 9/468* (2013.01); *G06K 9/4609* (2013.01); *G06K 9/4642* (2013.01)

(58) Field of Classification Search
CPC ...... G06F 17/2785; G06F 16/58; G06F 21/32; G06F 16/583; G06F 16/5838; G06K 9/4671; G06K 9/6203; G06K 9/4661; G06K 9/00456; G06K 9/00684; G06K 9/468; G06K 9/00442; G06K 9/4609; G06K 9/4642; G06K 9/4685; G06T 7/73; G06T 7/0012; G08C 25/00; H04L 63/08
USPC ......... 358/1.1; 382/141, 154, 169, 195, 209; 463/42; 704/9; 705/38; 713/186; 715/716; 726/7
See application file for complete search history.

(56) References Cited

U.S. PATENT DOCUMENTS

| | | | |
|---|---|---|---|
| 6,412,909 B1* | 7/2002 | Tayuki | B41J 2/2132 347/15 |
| 6,571,292 B1* | 5/2003 | Fletcher | H04L 29/06 709/202 |
| 7,620,200 B2 | 11/2009 | Rhoads | |
| 7,751,622 B2* | 7/2010 | Cahill | G06T 7/0012 382/169 |
| 7,860,312 B2* | 12/2010 | Handley | G06K 9/00469 382/173 |
| 8,204,293 B2 | 6/2012 | Csulits et al. | |
| 8,453,922 B2* | 6/2013 | Ragnet | G06F 16/93 235/375 |
| 8,913,285 B1 | 12/2014 | Neubrand | |
| 10,055,747 B1* | 8/2018 | Sherman | G06F 21/31 |
| 2001/0028748 A1* | 10/2001 | Sato | H04N 19/17 382/239 |
| 2003/0086127 A1* | 5/2003 | Ito | H04N 1/40062 358/462 |
| 2003/0198386 A1* | 10/2003 | Luo | G06K 9/325 382/199 |
| 2004/0109035 A1* | 6/2004 | Otokita | B41J 2/17566 347/5 |
| 2006/0080547 A1* | 4/2006 | Higashiura | G06F 21/34 713/186 |
| 2006/0203275 A1* | 9/2006 | Moro | H04N 1/00806 358/1.13 |
| 2006/0256392 A1 | 11/2006 | Van Hoof et al. | |
| 2006/0269142 A1* | 11/2006 | Schweid | G06K 9/00456 382/209 |
| 2006/0290948 A1* | 12/2006 | Ferlitsch | G06F 3/1234 358/1.1 |
| 2007/0159522 A1 | 7/2007 | Neven | |
| 2007/0237427 A1* | 10/2007 | Patel | G06Q 40/02 382/305 |
| 2008/0104118 A1* | 5/2008 | Pulfer | G06F 16/986 |
| 2008/0262953 A1* | 10/2008 | Anderson | G06Q 40/02 705/35 |
| 2009/0080033 A1* | 3/2009 | Arai | H04N 1/38 358/462 |
| 2009/0197685 A1* | 8/2009 | Shuster | A63F 13/837 463/42 |
| 2009/0210406 A1* | 8/2009 | Freire | G06F 16/35 |
| 2009/0287655 A1* | 11/2009 | Bennett | G06F 16/58 |
| 2011/0128360 A1* | 6/2011 | Hatzav | G06K 9/00469 348/61 |
| 2011/0182500 A1* | 7/2011 | Esposito | G06F 3/04886 382/159 |
| 2011/0255794 A1 | 10/2011 | Neogi et al. | |
| 2011/0265003 A1* | 10/2011 | Schubert | G06F 3/0484 715/716 |
| 2012/0215864 A1* | 8/2012 | Fukuoka | G06Q 10/10 709/206 |
| 2012/0226600 A1* | 9/2012 | Dolev | G06Q 10/10 705/38 |
| 2012/0229872 A1 | 9/2012 | Dolev | |
| 2013/0015236 A1 | 1/2013 | Porter et al. | |
| 2013/0194448 A1 | 8/2013 | Baheti et al. | |
| 2013/0222559 A1 | 8/2013 | Lebaschi et al. | |
| 2014/0180981 A1 | 6/2014 | Dolev et al. | |
| 2014/0270479 A1* | 9/2014 | Berestov | G06T 7/13 382/154 |
| 2014/0282974 A1* | 9/2014 | Maher | H04L 9/3271 726/7 |
| 2015/0117784 A1* | 4/2015 | Lin | G06K 9/4671 382/195 |
| 2015/0169545 A1* | 6/2015 | Eisen | G06F 40/30 704/9 |
| 2015/0278338 A1* | 10/2015 | Heard | G06F 16/285 707/613 |
| 2017/0109600 A1* | 4/2017 | Voloshynovskiy | G06K 9/00577 |
| 2017/0140217 A1* | 5/2017 | Atzmon | H04N 19/136 |
| 2017/0236035 A1* | 8/2017 | Everett | G06K 9/628 382/141 |
| 2017/0330047 A1* | 11/2017 | Markin | B42D 25/30 |

OTHER PUBLICATIONS

"OpenCv," Wikipedia, Nov. 29, 2014, [https://en.wikipedia.org/w/index.php?title=OpenCV&oldid=635916837].

\* cited by examiner

Fig. 1a stage A: analyze scanned input, using processor to discriminate natural image from Text-Containing Image (document) e.g. forms and IDs by determining whether each input image has a large number, or a close-to-zero number, of text lines, e.g. by performing operations A1 – A4

A1. find all blobs in the image; may store blob data in computer data storage device

A2. determine whether or not the blobs identified in operation A1 are arranged in rows (rows may be found first roughly then at a finer level of discrimination)

A3. determine whether the rows found in operation A2 are collectively long or short.

A4: provide output e.g. on computer display – if rows found in operation A2 are collectively long, input image is text (document); if short, input image is a natural image (not document).

To Fig. 1b for stage B

Fig. 1b

Stage B: use processor on input images found to be text images, to determine whether input image found in stage A to include text, is an ID or a form e.g. by performing operations B1 – B4:

B1. generate (normalized) histogram of input image's gray level values

↓

B2. Compute entropy from histogram generated in operation B1, to quantify extent of distribution of input image's gray level values

↓

B3. provide output, e.g. on computer display, indicating that input image is an ID if entropy values computed in operation B2 are larger than predetermined threshold;

provide output indicating that input image is a form if entropy values computed in operation B2 are smaller than predetermined threshold

↓

B4. Route each individual input image to at least one image authentication station if the individual scanned image belongs to a scanned image category which the image authentication station is able to authenticate

Fig. 2

120: blobs are divided e.g. partitioned into rough horizontal rows

130. For every rough row compute a line that best fits the (centerpoints of the) blobs included in that rough row – e.g. as per method of Fig. 3

140: define the length of a fine line as the number of (remaining) blobs in the line.

Fig. 3

210: compute the least absolute distant line (L1), i.e. the line in the images that has minimal sum of absolute differences over all the blobs in this rough line. An absolute distance between a line and a blob is defined as the absolute distance between the line and the blob's center point.

220: find the median of the distances between the L1 line of the rough row and all the blobs of that rough line.

230: discard blobs which belong to the line whose center point distance from the line is more than 6 (say) pixels away from a central tendency (e.g. median) of the distance values.

Fig. 6

610: Use a gateway image processor for on-line filtering (e.g. as per suitable operations from method of Figs. 1a – 1b) of incoming scanned images to determine whether or not the incoming scanned image belongs to a scanned image category characterized in that at least one image authentication station is unable to process scanned images which do not belong to that category

↓

620: transmit each individual scanned image to the image authentication station/s only if gateway image processor determines that individual image belongs to that category

Fig. 7

710: Use a gateway image processor for on-line filtering (e.g. as per suitable operations from method of Figs. 1a – 1b) of incoming scanned images to determine whether or not the incoming scanned image belongs to a scanned image category characterized in that at least one image authentication station is unable to process scanned images which do not belong to that category

↓

720: Use gateway image processor also for first-line low-cost authentication of incoming scanned images, typically, only for images not filtered out

↓

730: save processing time of a high-cost authentication functionality (for authenticating images for which first-line low-cost authentication fails) by routing a smaller number of scanned images thereto including deciding not to submit at least one individual scanned image to high-cost authentication if that individual scanned image was already recognized by gateway as not belonging to the scanned image category

Fig. 8

810: provide a plurality of image authentication stations customized to perform a corresponding plurality of image authentication tasks but unable to process scanned images which do not belong to a scanned image category

820: use a single gateway image processor for on-line filtering (e.g. as per suitable operations from method of Figs. 1a – 1b) of incoming scanned images to determine whether or not the incoming scanned image belongs to the scanned image category

830: transmit each individual scanned image to one or more of the image authentication station/s only if the gateway image processor determines that the individual image belongs to that category, thereby to conserve processing resources by having a single gateway image processor filter out scanned images which many image authentication stations are unable to process.

Fig. 9

910: Use a non-customized hence cost-effective gateway image processor for on-line filtering (e.g. as per suitable operations from method of Figs. 1a – 1b) of incoming scanned images to determine whether or not the incoming scanned image belongs to a scanned image category characterized in that at least one image authentication station in a population of downstream manual stations is unable to process, or less skilled or speedy in processing, scanned images which do not belong to that category

↓

920: Use non-customized gateway image processor for initial interfacing with remote end-users including providing feedback indicating that image authentication stations are unable to process certain scanned images found not to belong to that category

↓

930: transmit each individual scanned image to manual image authentication station/s only if gateway image processor determines that individual image belongs to that category.

↓

940: Use manual image authentication station/s for non-real-time authentication

METHODS FOR CATEGORIZING INPUT IMAGES FOR USE E.G. AS A GATEWAY TO AUTHENTICATION SYSTEMS

FIELD OF THIS DISCLOSURE

The present invention relates generally to systems for processing scanned images and more particularly to systems for processing scanned documents.

BACKGROUND FOR THIS DISCLOSURE

Systems for processing scanned images are known; systems for processing scanned documents are also known.

Conventional technology constituting background to certain embodiments of the present invention is described in the following:

Co-pending patent document WO 2013014667 A2 describes a system and methods for computerized machine-learning based authentication of electronic documents including classification thereof.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a gateway to at least one, and typically a plurality of, downstream computerized systems for scanning and/or processing paper forms and/or physical IDs. The gateway is operative to receive a scanned image and to generate an initial categorization of the scanned image as falling within initial categories such as but not limited to any or all of: form image, ID image, natural image, blank image, other. Suitable messages regarding the initial categorization may be provided to the downstream systems and/or directly to an end-user who provided the scanned image.

Certain embodiments of the present invention seek to provide a gateway operative to distinguish between categories, such as user-specified categories. For example, the gateway may categorize incoming files as either pictures, forms or documents. And/or, the gateway may enable a system to differentiate between documents the system supports, unsupported documents and everything else (e.g. pictures and forms). It is appreciated that according to certain embodiments, events to be identified may be defined such as a "this incoming file isn't one of our supported documents, but it is a document". Also, any suitable action may be defined which is triggered by a specific event.

For example, if the event detected is "this incoming file is a supported ID document" (e.g. if the gateway herein identifies an incoming file as an ID and the ID authentication functionality identifies the incoming file routed thereto as one of a plurality of ID document types it supports) the system may inform an operator all is well and/or may perform ID-document-type-specific fraud tests. If the event detected is "this incoming file isn't one of our supported ID documents, but it is (some sort of) ID document" the system may alert a human operator that the unrecognized ID document needs to be authorized manually and/or the system may prompt the human operator to identify a new type of ID document e.g. by displaying a suitable "define a new type of ID document" screen. If the event detected is "this incoming file is not even an ID document", the system may communicate with a remote individual who provided the incoming file and indicate that s/he has erroneously sent in a file which is not an ID document, possibly attaching to this communication a scanned representation of the file as received.

Certain embodiments of the present invention seek to provide a system operative for determining the authenticity of an ID image, including an initial gateway determination of whether an input image is an ID image or not.

Certain embodiments of the present invention seek to provide a system operative for determining the authenticity of a form, including an initial gateway determination of whether an input image is a form image or not.

The following terms may be construed either in accordance with any definition thereof appearing in the prior art literature or in accordance with the specification, or as follows:

Blob: image of alphanumeric symbol e.g. letter or digit, or image of sequence thereof.

Computerized Authentication: Use of Computer Vision to determine authentication of an object captured in an image.

Entropy: measure of randomness (uncertainty as opposed to certainty) of a process/variable. A uniformly distributed variable has maximal entropy so the entropy test has been used to identify encrypted data which, as opposed to "clear" data, tends to have a uniform distribution.

form image: scanned image that contains text lines, but is not an ID image. Typical examples: form, page of a book, etc.

ID image: scanned image of an official certificate, typically used for identifying a person and including a photograph and/or biometric information identifying the person. Typical examples: an ID card, passport or driving license.

Natural Images: scanned image which contains no text lines or almost none. Typical examples: photographs or computer-generated/hand-drawn representations of landscapes, faces, people, animals, objects, abstract designs, and combinations thereof.

Text Containing Image: A scanned image which is either an ID image or a form image but is not a natural image.

There is thus provided, inter alia, a method including stage A: analyze scanned input, using processor to discriminate natural image from Text-Containing Image (document) e.g. forms and IDs by determining whether each input image has a large number, or a close-to-zero number, of text lines, e.g. by performing operations A1-A4 below; and Stage B: use processor on input images found to be text images, to determine whether input image found in stage A to include text, is an ID or a form e.g. by performing operations B1-B4 below.

Operations A1-A4 may be as follows:
  A1. find all blobs in the image; may store blob data in computer data storage device;
  A2. determine whether or not the blobs identified in operation A1 are arranged in rows (rows may be found first roughly then at a finer level of discrimination); and
  A3. determine whether the rows found in operation A2 are collectively long or short; and
  A4. provide output e.g. on computer display—if rows found in operation A2 are collectively long, input image is text (document); if short, input image is a natural image (not document).

Operations B1-B4 may be as follows:
  B1. generate (normalized) histogram of input image's gray level values;

B2. Compute entropy from histogram generated in operation B1, to quantify extent of distribution of input image's gray level values;

B3. provide output, e.g. on computer display, indicating that input image is an ID if entropy values computed in operation B2 are larger than predetermined threshold; provide output indicating that input image is a form if entropy values computed in operation B2 are smaller than predetermined threshold; and B4. Route each individual input image to at least one image authentication station if the individual scanned image belongs to a scanned image category which the image authentication station is able to authenticate.

The present invention typically includes at least the following embodiments:

Embodiment 1

A scanned image authentication system employing at least one image authentication station which is unable to process scanned images which do not belong to at least one individual scanned image category, the system comprising: a gateway image processor operative for on-line filtering of an incoming scanned image to determine whether or not the incoming scanned image belongs to the scanned image category, and a computer-implemented interface operative to transmit each individual scanned image to the at least one image authentication station only if the gateway image processor has determined that the individual scanned image belongs to the at least one individual scanned image category.

It is appreciated that the gateway may be configured to detect one or more of many different categories which many different image authentication station/s are unable to process such as but not limited to non-IDs (scanned images which are not IDs), non-forms (scanned images which are not forms), blank images, blurred images, shiny images.

Embodiment 2

A system according to any of the preceding embodiments wherein the category comprises an ID and wherein the filtering comprises determining whether or not blobs in the image are arranged in rows and determining whether or not entropy of a histogram of the input image's gray level values exceeds a threshold.

Embodiment 3

A system according to any of the preceding embodiments wherein the category comprises a form and wherein the filtering to determine comprises determining whether or not blobs in the image are arranged in rows and determining whether or not entropy of a histogram of the input image's gray level values falls below a threshold.

Embodiment 4

A system according to any of the preceding embodiments wherein a feedback message, whose content is determined depending on whether or not the gateway image processor has identified the scanned image as belonging to the scanned image category, is transmitted to an end-user who provided at least one user-scanned image, thereby to allow the end-user to send another scanned image if the message's content indicates that gateway image processor has identified the scanned image as not belonging to the scanned image category.

Embodiment 5

A system according to any of the preceding embodiments wherein at least one image authentication processor is employed which is unable to process scanned images which the gateway image processor has identified as not belonging to the scanned image category and wherein the gateway's determination is employed to determine whether or not to transmit each scanned image to the at least one image authentication processor.

Embodiment 6

A system according to any of the preceding embodiments wherein the image authentication station comprises a scanned image display operative to display scanned images to a human operator for human image authentication.

Embodiment 7

A system according to any of the preceding embodiments wherein the image authentication station comprises an image authentication processor.

Embodiment 8

A system according to any of the preceding embodiments wherein the gateway image processor is operative only for the on-line filtering of an incoming scanned image and not for authentication of the incoming scanned image.

Embodiment 9

A system according to any of the preceding embodiments wherein the gateway image processor is operative for the on-line filtering of an incoming scanned image and for first-line low-cost authentication of the incoming scanned image and wherein the interface is operative to transmit each individual scanned image not filtered out by the on-line filtering, to at least one image authentication station comprising a high-cost authentication functionality capable of authenticating incoming scanned images which the first-line low-cost authentication has failed to authenticate, and wherein the interface decides whether or not to route at least one scanned image to the high-cost authentication functionality, at least partly depending on whether or not the at least one scanned image was recognized by the gateway image processor as belonging to the at least one individual scanned image category, thereby to save processing time of the high-cost authentication functionality by routing a smaller number of scanned images thereto.

Embodiment 10

A system according to any of the preceding embodiments wherein the system employs a plurality of image authentication stations customized to perform a corresponding plurality of image authentication tasks and wherein all of the stations are unable to process scanned images which do not belong to the individual scanned image category, such that a single gateway image processor is able, independent of the tasks, to filter out scanned images which all of the plurality of image authentication stations are unable to process.

It is appreciated that the interface may be augmented by any element of artificial intelligence-governed initial dialogue which is common to the various downstream stations served by the system rather than being specific to individual ones from among those stations, such as accommodation to end user's language or gender, introduction of holiday or weekend messages into dialogue, and so forth.

It is appreciated that the system provides a non-customized hence cost-effective solution for a population of downstream manual stations which may be able to afford a non-customized software solution for the critical function of initial interfacing with remote end-users but cannot afford or make viable, a customized software solution for each station's own individual downstream functionalities which are therefore performed manually. The result is a user experience of interacting with a remote, intelligent, on-line system despite the fact that the system's core functionalities are in fact not performed in real time and may even be manual.

Embodiment 11

A system according to any of the preceding embodiments wherein the tasks undergo fluctuation over time and wherein the single gateway image processor is operative, independent of the fluctuation, to filter out scanned images which all of the plurality of image authentication stations are unable to process.

Embodiment 12

A system according to any of the preceding embodiments wherein the filtering comprises determining whether or not blobs in the image are arranged in rows.

Embodiment 13

A system according to any of the preceding embodiments wherein the filtering comprises determining whether or not entropy of a histogram of the input image's gray level values exceeds a threshold.

Embodiment 14

A system according to any of the preceding embodiments wherein the gateway image processor is operative for the on-line filtering of an incoming scanned image and for first-line low-cost authentication of the incoming scanned image and wherein the interface is operative to transmit at least one scanned image, to at least one image authentication station comprising a high-cost authentication functionality capable of authenticating incoming scanned images which the first-line low-cost authentication has failed to authenticate, and wherein the interface decides whether or not to route at least one scanned image to the high-cost authentication functionality, at least partly depending on whether or not the at least one scanned image was recognized by the gateway image processor as belonging to the at least one individual scanned image category, thereby to save processing time of the high-cost authentication functionality by routing a smaller number of scanned images thereto.

Embodiment 15

A scanned image authentication method employing at least one image authentication station which is unable to process scanned images which do not belong to at least one individual scanned image category, the method comprising: using a gateway image processor for on-line filtering of an incoming scanned image to determine whether or not the incoming scanned image belongs to the scanned image category, and using a computer-implemented interface to transmit each individual scanned image to the at least one image authentication station only if the gateway image processor has determined that the individual scanned image belongs to the at least one individual scanned image category.

Embodiment 16

A computer program product, comprising a non-transitory tangible computer readable medium having computer readable program code embodied therein, the computer readable program code adapted to be executed to implement a scanned image authentication method employing at least one image authentication station which is unable to process scanned images which do not belong to at least one individual scanned image category, the method comprising: using a gateway image processor for on-line filtering of an incoming scanned image to determine whether or not the incoming scanned image belongs to the scanned image category, and using a computer-implemented interface to transmit each individual scanned image to the at least one image authentication station only if the gateway image processor has determined that the individual scanned image belongs to the at least one individual scanned image category.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations of flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 1a-1b, taken together is a simplified flowchart illustration of a method for on-line filtering of an incoming scanned image to determine whether or not the incoming scanned image belongs to a scanned image category that a given image authentication station or functionality can accommodate e.g. by making initial determination of whether an input image is an ID image or not.

FIG. 2 is a simplified flowchart illustration of a method for determining whether or not blobs identified in an input image are arranged in rows.

FIG. 3 is a simplified flowchart illustration of a method for computing a line that best fits various blobs identified in an image as being included in a single row.

FIGS. 6-9 are simplified flowchart illustrations of methods of operation, for example document processing systems, which may rely on an on-line filtering method such as that shown and described herein with reference to FIGS. 1a-1b. Methods and systems included in the scope of the present invention may include some (e.g. any suitable subset) or all of the functional blocks shown in the specifically illustrated implementations by way of example, in any suitable order e.g. as shown.

Figure 4:
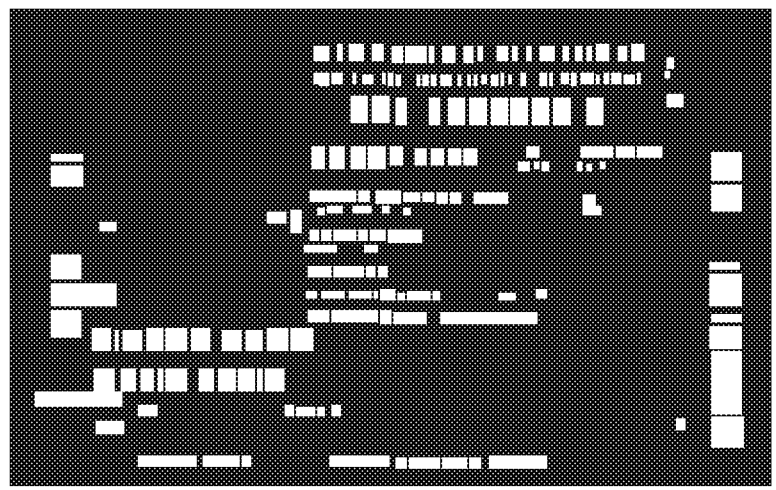
FIG. 4 is a pictorial illustration representing the outcome of applying a blob finding procedure on an ID card.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Certain embodiments provide methods for categorizing input images for use e.g. as a gateway to authentication systems.

Certain embodiments provide a gateway to at least one, and typically a plurality of, downstream computerized scanned image processors e.g. computerized systems for scanning and/or processing paper forms and/or physical IDs. The gateway is operative to receive a scanned image and to generate an initial categorization of the scanned image as falling within initial categories such as but not limited to any or all of: form image, ID image, natural image, blank image, other. Suitable messages regarding the initial categorization may be provided to the downstream systems and/or directly to an end-user who provided the scanned image.

A particular advantage of certain embodiments is that despite the wide diversity in (hence necessary high development cost of) the functionalities of computerized scanned image processors (one of which may be providing airport security in country A with regulatory requirements A, another of which may be providing airport security in country B with regulatory requirements B, a third of which may itself be a gateway to a financial institution which inputs paper financial forms, etc.) it turns out that there is nonetheless a common denominator to many or all computerized scanned image processors. Development of this common functionality in software is thereby more cost-effectively achieved herein, since developing a single common gateway is more cost effective than superfluously re-developing the common functionality integrally within each and every one of the many downstream computerized systems. This common denominator is due to the significant percentage of scanned images which have been found to be received from end-users which are non-compliant with the request sent to the end-user by the downstream system/s. For example, in practice it is observed that a large number of images are sent by end-users to form-processing systems which are not forms, and to ID-processing systems which are not IDs. A large number of natural images or even blank images are received.

A particular advantage of certain embodiments is that initial on-line feedback can be provided to end-users even if the functionality of the downstream system/s is not achievable at on-line speed, e.g. because certain aspects of the downstream computerized system/s' functioning are not achievable in real time such as manual inspection of scanned images and/or off-line information such as cheque clearance information, which is used by, hence holds up the response time of, a fully automated system. Provision of initial on-line feedback is an advantageous addition to later provision of off-line feedback for at least 2 reasons: (a) average time of handling of end-users who have failed to provide the required scanned image is expedited, statistically, because a significant proportion of these end-users is informed online, hence able to immediately remedy, the fact that they have failed to provide the required scanned image/s; (b) end-users receive immediate meaningful input online, which encourages them to remain engaged with the downstream computerized system rather than disengaging from the downstream computerized system out of frustration with what they would otherwise perceive as a non-responsive or difficult to use interface.

It is appreciated that even if only imperfect identification of unprocessable categories is achievable, i.e. even if only some of the unprocessable incoming scanned image "traffic" can be identified, nonetheless reduced total processing time is achieved.

A particular advantage of certain embodiments is that the gateway may be designed to filter out input images which are clearly unprocessable by at least one particular station, not even presenting these images to the station in question. For example, if a human operator is trained to manually analyze scanned images of bank forms or ID cards, the gateway to that operator may be designed to identify natural images (say, or other "junk" images), which occur not infrequently in incoming streams of images especially if these are provided by laymen end-users, and not even present such natural images to the manual operator. It is appreciated that each image presented to an operator takes up her or his time, e.g. in opening the image, rejecting the image as junk, closing the image, etc. Automated stations may waste processing time on junk images and/or may charge a fee per input image; for either or both of these reasons, providing a gateway which filters out input images which are clearly unprocessable, is advantageous.

A method for sorting input images into three classes or categories, e.g. ID images, form images and natural images, is now described. Suitable subsets of the operations below may be employed e.g. it is desired to configure the system only for:

generating an initial (gateway) categorization of an input (e.g. scanned) image as falling or not falling within the category of a form image; or generating an initial (gateway) categorization of an input (e.g. scanned) image as falling or not falling within the category of an ID image; or generating an initial (gateway) categorization of an input (e.g. scanned) image as falling or not falling within the category of a natural image.

Combinations of the above (e.g. systems which prompt an end-user to provide both ID and form, and seek to provide an initial (gateway) categorization of a first input (e.g. scanned) image as falling or not falling within the category of a form image; and of a second input (e.g. scanned) image as falling or not falling within the category of an ID image; and then to give the end-user a fast response if either of the two are not being provided.

The above method may for example be employed by a gateway image processor operative for on-line filtering of an incoming scanned image to determine whether or not the incoming scanned image belongs to the category which one or more specific authentication service providers are capable of authenticating.

FIGS. 1a-1b, taken together is a simplified flowchart illustration of a method for on-line filtering of an incoming scanned image to determine whether or not the incoming scanned image belongs to a scanned image category that a given image authentication station or functionality can accommodate e.g. by making initial determination of whether an input image is an ID image or not. The method of FIGS. 1a-1b may include one or both of two stages:

stage A: discriminate natural images from images of forms and of IDs;

stage B: then (i.e. typically subsequently) differentiate ID images from form images.

Stage A for Separating Text Containing Images e.g. forms and IDs, from Natural Images may be effected by determining whether each image has a large number, or a close-to-zero number, of text lines. The method of stage A may include some or all of the following operations, suitably ordered e.g. as follows:

Operation A1: find (the locations of) all blobs (dark local areas, or more generally, local areas whose brightness or color differs from the ambient brightness or color) in the image. Technologies for retrieving text blobs are known; for example:

a. it is known that connected components labeling algorithms may be employed to detect blobs each of which represents a separate letter, e.g. in an OCR context;

b. OpenCV, supported by Willow Garage and Itseez, is publicly available software which has a contour function operative to detect blobs;

c. EasyOCR, commercially available e.g. by contacting sales.americas@euresys.com, is a printed character reader which uses blob analysis functions to segment an image; and d. Computer Vision System Toolbox™ is a commercially available software product which includes an OCR function which recognizes text in images for various computer vision applications.

For example, FIG. 4 is an image representing the outcome of applying a blob finding procedure on an ID card including a photo at the top left, various lines of horizontal text starting from the top right, and even a line of vertical text extending along the right edge of the ID card.

In Operation A2, determine whether or not the blobs identified in operation A1 are arranged in rows. Rows may optionally be found first roughly then at a finer level of discrimination. The method of performing operation A2 may include some or all of operations 120, 130, 140 (FIG. 2), suitably ordered e.g. as shown.

Figure 5:
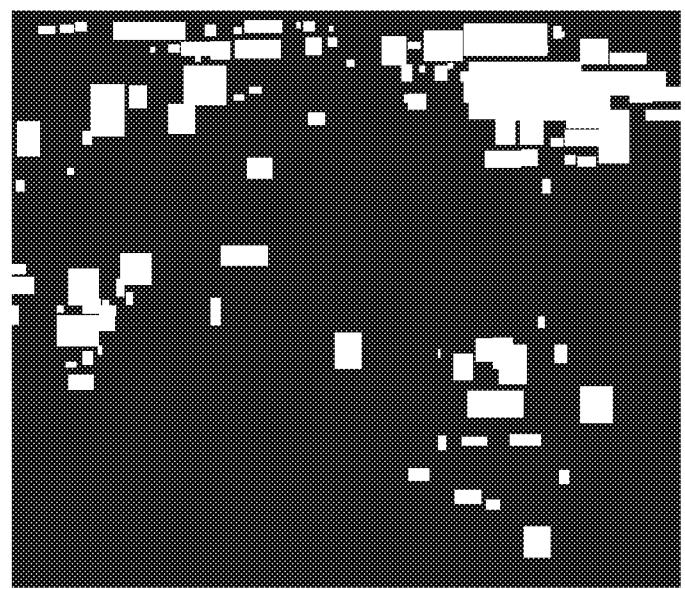
FIG. 5 is a pictorial illustration representing the outcome of applying a blob finding procedure on a non-text image, resulting in blobs which are irregularly or seemingly randomly distributed over the image as shown.

Operations 120-140 are operative to determine whether or not the blobs identified in operation 1a, are arranged in rows. Generally, blobs (e.g. dark local areas of the image) which are identified in text images, may be expected to be arranged in rows. Blobs which are identified in non-text images, may be expected to be irregularly or seemingly randomly distributed over the image, e.g. as shown in FIG. 5.

In operation 120 of FIG. 2, the blobs are divided e.g. partitioned into rough horizontal rows, e.g. using the following method:

For every pair of blobs b_i, b_ii found in operation A1, compute a center-point (center of gravity e.g.). Determine that blob B_i is in the same rough row as B_ii if B_i's middle point's Y parameter similar in value to B_ii's Y parameter and/or if B_i's middle point's Y parameter falls between B_ii's endpoints' Y parameters.

For example, the method may define pairs b_1 with b_2, b_2 with b_3, b_3 with b_4, etc. from among the blobs found in operation A1, proceeding in an order defined by the blobs' x coordinates (where x is the presumed axis along which lines of text are defined). For each such pair, a suitable same-row test is applied, e.g. if the midpoint (y1) of blob b_1 falls within the vertical range of b_2 and/or vice versa. If the pair of blobs passes the test, define that the pair of blobs are on the same horizontal row. If a blob b_n is on the same row as the blob before b_n (blob n−1) and as the blob after b_n (n+1) then all 3 blobs may be considered to be on the same horizontal row, and so forth regarding blobs (n+2), (n+3), . . . etc. if each blob b_i is found to comply with the same-row test, vis a vis the blob that preceded blob b_i.

Alternatively, any other suitable method may be employed for this operation. For example, for each blob found in operation A1, proceeding in an order defined by the blobs' x coordinates (where x is the presumed axis along which lines of text are defined), and within a given x coordinate by the blobs' y coordinates, check if each blob B belongs to some or all of the rough rows already defined; if so, add blob B to that row; if not, start a new rough row for that blob B.

It is appreciated that alternatively or in addition, the roles of the x and y coordinates may be reversed e.g. if a suitable criterion indicates that the attempt to partition into rough horizontal rows has been insufficiently successful and it is desired to attempt to partition into rough vertical rows instead (since the document may be rotated or may have vertical rows).

In operations 130, 140 the method determines whether the rough rows found tend to be long or short. If relatively long, determine that the input image is text; if relatively short, determine that the input image is a natural image and is not text. Before determining a rough row's length, the blobs originally belonging to that row may be re-examined and some may be discarded. For example, as described in operations 130-140 of FIG. 2, each rough row may be converted into a best fitting line and outlying blobs, relative to that line, may be discarded, before determining a rough row's length. Any suitable method may be employed to determine the length of each (or only some of) the rough rows found. For example, length may be defined as the number of blobs in a row, or may be computed by computing widths of blobs in the row and summing, and so forth. Any suitable method may be employed to determine whether a set of rough rows found are collectively long or short (operation A3); such as but not limited to suitably combining (some of) the lengths of the rough rows in the set. For example, in operation A3 the n (e.g. 2) longest rows are combined (e.g. averaged) but alternatively the lengths of all rows of at least a minimal length might be summed or averaged.

Operation 130 of FIG. 2:

Refine each rough row, thereby to generate a "fine line". Typically, this may be achieved by computing, for each rough row, a line that best fits the (centerpoints of the) blobs included in that rough row. For example, the operations of FIG. 3 may be employed:

210: Define a least distant line L_ld for a given rough row R, by computing the line in the image whose sum of absolute differences from each of the centerpoints of the blobs in the rough row, is minimal.

220: find a central value e.g. median, M_ld of the distances between line L_ld and all the blobs of that rough line.

230: discard from rough row R, all blobs whose center point's distance from the least distant line L_ld exceeds M_ld+/−6 (say) pixels. The set of remaining blobs is termed herein "the fine line" for rough row R. Any suitable parameter may of course be employed for this criterion, such as but not limited to 6 or any integer between 1 and 10; e.g. based on an empirically found median of heights of blobs given a reasonably representative sample of the "universe" of inputs e.g. documents that a particular system is expected to process.

Referring again to FIG. 2, in operation 140, the length of a fine line is defined as the number of (remaining) blobs in the line. If the average of the N=2 (say; or alternatively any other suitable integer such as 1 or 3 or 4 or more) longest lines in the image is greater than L=7 (say; or any other integer between say 7-14), output that the input image is a text image, otherwise output that the input image is a natural image. Alternatively, the parameters above may have different values. It is appreciated that suitable prior analysis may be performed to determine suitable parameter values for each given applications; the values of N=2; L=7 for example were found suitable for systems which process ID-cards in which prior analysis indicated that the presence in an input image of 2 or more lines of significant (e.g. N=7, or 9 or 11 or 14) length was a strong indication of input images which were not a mere natural image (not just a native picture).

In prior art analysis, testing can be performed in which the minimum number of characters per line in the above context (or other parameter of interest) is an input parameter. According to testing results a suitable or optimal range for each parameter e.g. minimum number of well detected characters in this example, may be determined.

Stage B of FIG. 1b, which is typically performed only on images found to be text images, is now described in detail. Stage B typically determines whether an input image found to include text, is an ID or a form. The method of stage B may include some or all of operations B1-B4, suitably ordered e.g. as in FIG. 1b, and described below.

In Stage B, the method typically determines whether an input text image is an ID Image or a Form Image by generating a histogram of the input text image's gray levels (e.g. converting the input text image's pixel values into gray level values and generating a histogram to represent the resulting set of gray level values.

Typically, before computing an entropy, the histogram is normalized such that each entry (0 . . . 255) becomes a probability p of that entry and such that the entropy H becomes $$H = -\sum_{k=0}^{n} P * \log(p).$$

Next (operation B2 of FIG. 1b), determines whether the shape of the histogram is:
i. concentrated in two or some other small number of narrow peaks; or
ii. is distributed over a wider range of gray level values.

If (i) is true, the system deduces that the input image is a form having a uniform luminosity level on which appear lines and text having one or a few different luminosity levels (indicating one or more uniform colors used to represent the form, such as black on white, or black and red on white. If (ii) is true, the system deduces that the input image is an ID and not a form.

It is appreciated that the extent to which a given histogram is distributed may for example be quantified by measuring the entropy of the histogram. In this embodiment, a larger entropy value than a given cut-off point may be used to indicate an ID rather than a form, since a large entropy indicates that a histogram is more distributed.

In operation B3, then, the system provides output indicating that input image is an ID if entropy values computed in operation B2 are larger than predetermined threshold; and/or output indicating that input image is a form if entropy values computed in operation B2 are smaller than predetermined threshold.

Any suitable cut-off point (threshold) may be employed, such as, that if when the entropy H<3.2 (say; or any other suitable value between 3 and 4; or between 1 and 10) then the input image is a Form and otherwise the input image is an ID.

In operation B4, each individual input image is routed to at least one image authentication station if the individual scanned image belongs to a scanned image category which the image authentication station is able to authenticate.

A particular advantage of certain embodiments is that input images which are not identified by a document authentication system as supported documents, are nonetheless characterized, e.g. as natural images and/or as forms and/or as non-supported ID documents. In the absence of the gateway of certain embodiments shown and described herein, a document authentication system might be forced to characterize all input images other than supported documents, as non-supported ID documents while empirically, the factual situation is that a great many input images provided to document authentication systems are not ID documents at all.

This gateway capability provides more accurate statistics to the developers of the system (who might otherwise vastly overestimate the incidence of unsupported ID documents), and to end-users of the system many of whom might otherwise be unable to use the system due to a user-experience of having complied and not having received any useful feedback pointing out that the input they have provided is far from the required input (e.g. is perhaps a blank page or unrelated document or image, rather than an ID image).

The gateway of certain embodiments shown and described herein is also particularly suited to 2-tiered document authentication systems in which a first, low-cost document authentication subsystem authenticates what it can, whereas input images which the first, low-cost subsystem fails to recognize, are sent to a second, higher-cost document authentication subsystem or service which may for example comprise a highly paid human operator trained in document authentication. For example, if 90% of the input images are junk (e.g. are clearly not ID documents at all), then the gateway of certain embodiments shown and described herein can reduce the number of documents that need to be sent to the second, higher-cost document authentication subsystem or service by an order of magnitude.

For a human operator, for example, processing "junk" input is both frustrating and time-consuming hence a gateway which greatly reduces "junk" inputs greatly reduces both operating costs and frustration-engendered errors. Even for an automated document authentication system, each "junk" input image requires book-keeping hence a non-trivial amount of CPU time.

The gateway performing any of the above methods may for example be implemented as an API or as a Website, which may implement application-specific logic.

According to certain embodiments, a website may provide templates for gateway logic and message content (alerts e.g.) provided when the logic is true. Each user may select a template (or design his own), such as these 3 example templates:

Template1 for Form-Processing Downstream Systems:
If form detected: Thank you for sending this form. (Optional): here is the form we received: IMAGE. We will contact you within PARAMETER hours/days.
Otherwise i.e. if scanned image is not a form: Thank you for contacting us. Here is what you sent: SCANNED IMAGE SENT BY END-USER. This is not a form; please can you send the requested form. (optional): here is an example of the form we need you to send: IMAGE.

Template2 for Id-Processing Downstream Systems:
If ID-image detected: Thank you for sending this ID. (Optional): here is the ID we received: IMAGE. We will contact you within PARAMETER hours/days.
(Optional:) If form detected: You seem to have sent us a form instead of your ID. Please send your ID (optional): here is an example of the ID we need you to send: IMAGE.
Otherwise i.e. if scanned image is neither an ID image nor a form: Thank you for contacting us. Here is what you sent: SCANNED IMAGE SENT BY END-USER This is not an ID; please can you send the requested ID. (optional): here is an example of the ID we need you to send: IMAGE.

Template3 for Form/Id Processing Downstream Systems:
If form detected responsive to request to send form: Thank you for sending this form. (Optional): here is the form we received: IMAGE.
If ID-image detected responsive to request to send ID: Thank you for sending this ID. (Optional): here is the ID we received: IMAGE.
We will contact you within PARAMETER hours/days.
If scanned image sent responsive to request to send form/ID is not a form/ID respectively: Otherwise i.e. if scanned image is not a form: Thank you for contacting us. Here is what you sent: SCANNED IMAGE SENT BY END-USER This is not a form; please can you send the requested form. (optional): here is an example of the form we need you to send: IMAGE It is appreciated that some or all of the operations of FIGS. 1a-1b may be employed in conjunction with various types of document authentication systems and may be particularly useful in generating artificially intelligent outputs for an end-user. For example, a system may receive scanned images, and for each, determine whether or not the scan just received is a natural image e.g. using the relevant operations from FIGS. 1a-1b. If the scan just received is a natural image the system may generate a "this is not a document" (e.g. is a blank page, for example) output for an end-user. If the scan has been found not to be a natural image (to be a document e.g.) the system may then determine whether or not this is an ID document specifically, e.g. using the relevant operations from FIGS. 1a-1b and if not, the system may generate a suitable output such as "this is a document but not an ID document" for an end-user. Alternatively or in addition, before or after the ID-determination operation above, the system may determine whether or not the scan is a form specifically, e.g. using the relevant operations from FIGS. 1a-1b and if so, the system may generate a suitable output such as "this is a form not an ID document" for an end-user. Or, for a system which processes forms, the system may simply move forward to processing the scan as mandated if the system determines that the scan is a form e.g. using the relevant operations from FIGS. 1a-1b.

When and if the scan has been found to be an ID-document, the system may authenticate the ID-document using system-defined tests which are typically specific to a particular supported ID-document type. In addition, the system may support a special "bucket" (category) for ID documents which belong to none of the ID-document types supported by the system. If a scan is determined to fall within this category, the system typically provides a suitable output e.g. "this is an ID document which is not supported by this system". Functionality for authenticating scanned ID-documents based on forgery tests which may be specific to a particular supported ID-document type, as well as for identifying ID documents which belong to none of the ID-document types supported by the system, is known and is described e.g. in the following co-pending patent document: "System and methods for computerized machine-learning based authentication of electronic documents including use of linear programming for classification" (WO 2013014667 A2).

A particular advantage of certain embodiments shown and described herein is ability to function intelligently and efficiently in an environment in which the scanned input which is received is frequently different from the scanned input which is expected. For example, if the end-users providing the scanned input are laypersons who may have previously used the system infrequently or not at all, a large proportion of scans received from end-users may be completely unsuitable for processing by the system's main functionality (which may be authentication of ID documents, or computerized processing of forms, and so forth).

It is appreciated that if desired, the method of FIGS. 1a-1b may be applied to each individual received scan, only after an initial, unsuccessful pass has been made to try and apply a system's main functionality to the individual received scan. For example, the system described in the above-referenced co-pending WO 2013014667 patent document may be applied, and only if the system determines that an input does not belong to any supported ID-document type, the method of FIGS. 1a-1b may be applied to determine if perchance the input is not a document at all, is a document but not an ID-document, and so forth.

It is appreciated that many different systems for intelligent, efficient document processing may rely on an on-line filtering method such as that shown and described herein with reference to FIGS. 1a-1b. Example systems' methods of operation are shown in FIGS. 6-9; in each of which some or all of the illustrated operations may be provided, in any suitable order e.g. as shown.

The method of FIG. 6 typically comprises:

Operation 610: Use a gateway image processor for on-line filtering (e.g. as per suitable operations from method of FIGS. 1a-1b) of incoming scanned images to determine whether or not the incoming scanned image belongs to a scanned image category characterized in that at least one image authentication station is unable to process scanned images which do not belong to that category Operation 620: transmit each individual scanned image to the image authentication station/s only if gateway image processor determines that individual image belongs to that category.

The method of FIG. 7 typically comprises:

Operation 710: Use a gateway image processor for on-line filtering (e.g. as per suitable operations from method of FIGS. 1a-1b) of incoming scanned images to determine whether or not the incoming scanned image belongs to a scanned image category characterized in that at least one image authentication station is unable to process scanned images which do not belong to that category Operation 720: Use gateway image processor also for first-line low-cost authentication of incoming scanned images, typically, only for images not filtered out Operation 730: save processing time of a high-cost authentication functionality (for authenticating images for which first-line low-cost authentication fails) by routing a smaller number of scanned images thereto including deciding not to submit at least one individual scanned image to high-cost authentication if that individual scanned image was already recognized by gateway as not belonging to the scanned image category The method of FIG. 8 typically comprises:

Operation 810: provide a plurality of image authentication stations customized to perform a corresponding plurality of image authentication tasks but unable to process scanned images which do not belong to a scanned image category Operation 820: use a single gateway image processor for on-line filtering (e.g. as per suitable operations from method of FIGS. 1a-1b) of incoming scanned images to determine whether or not the incoming scanned image belongs to the scanned image category Operation 830: transmit each individual scanned image to one or more of the image authentication station/s only if the gateway image processor determines that the individual image belongs to that category, thereby to conserve processing resources by having a single gateway image processor filter out scanned images which many image authentication stations are unable to process.

The method of FIG. 9 typically comprises:

Operation 910: Use a non-customized hence cost-effective gateway image processor for on-line filtering (e.g. as per suitable operations from method of FIGS. 1a-1b) of incoming scanned images to determine whether or not the incoming scanned image belongs to a scanned image category characterized in that at least one image authentication station in a population of downstream manual stations is unable to process, or less skilled or speedy in processing, scanned images which do not belong to that category.

Operation 920: Use non-customized gateway image processor for initial interfacing with remote end-users including providing feedback indicating that image authentication stations are unable to process certain scanned images found not to belong to that category.

Operation 930: transmit each individual scanned image to manual image authentication station/s only if gateway image processor determines that individual image belongs to that category.

Operation 940: Use manual image authentication station/s for non-real-time authentication.

When image analysis stations, manual or automated, are said herein to be "unable" to process certain images or categories thereof, or images or categories thereof are said to be "unprocessable" by a certain station, or similar wording, this wording is intended to include stations which are less skilled or speedy or successful in processing such images or categories of images, relative to other stations which are more skilled and/or speedy and/or successful at the same task.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the steps or operations of any of the methods shown and described herein, in any suitable order including simultaneous performance of suitable groups of steps as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including method steps, which are described in the context of separate embodiments may also be provided in combination in a single embodiment. For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including method steps, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A scanned image authentication system employing at least one image authentication station which is unable to process scanned images which do not belong to at least one individual scanned image category, the system comprising:
   a gateway image processor operative for on-line filtering of an incoming scanned image to determine whether or not the incoming scanned image belongs to said scanned image category, and
   a computer-implemented processor operative to route each individual scanned image to said at least one image authentication station, for performing authentication of said individual scanned image, only if said gateway image processor has determined that said individual scanned image belongs to said at least one individual scanned image category.

2. The system according to claim 1 wherein said category comprises an ID and wherein said filtering comprises determining whether or not blobs in said incoming scanned image are arranged in rows and determining whether or not entropy of a histogram of said incoming scanned image's gray level values exceeds a threshold.

3. The system according to claim 1 wherein said category comprises a form and wherein said filtering to determine comprises determining whether or not blobs in said incoming scanned image are arranged in rows and determining whether or not entropy of a histogram of said incoming scanned image's gray level values falls below a threshold.

4. The system according to claim 1 wherein a feedback message, whose content is determined depending on whether or not said gateway image processor has identified said scanned image as belonging to said scanned image category, is transmitted to an end-user who provided at least one user-scanned image, thereby to allow the end-user to send another scanned image if said message's content indicates that gateway image processor has identified said scanned image as not belonging to said scanned image category.

5. The system according to claim 1 wherein at least one image authentication processor is employed which is unable to process scanned images which said gateway image processor has identified as not belonging to said scanned image category and wherein the determination of said gateway image processor is employed to determine whether or not to transmit each scanned image to said at least one image authentication processor.

6. The system according to claim 1 wherein said image authentication station comprises a scanned image display operative to display scanned images to a human operator for human image authentication.

7. The system according to claim 1 wherein said image authentication station comprises an image authentication processor.

8. The system according to claim 1 wherein said gateway image processor is operative only for said on-line filtering of an incoming scanned image and not for authentication of said incoming scanned image.

9. The system according to claim 1 wherein said gateway image processor is operative for said on-line filtering of an incoming scanned image and for first-line low-cost authentication of said incoming scanned image and wherein said processor is operative to transmit each individual scanned image not filtered out by said on-line filtering, to at least one image authentication station comprising a high-cost authentication functionality capable of authenticating incoming scanned images which said first-line low-cost authentication has failed to authenticate, and wherein said interface decides whether or not to route at least one scanned image to said high-cost authentication functionality, at least partly depending on whether or not said at least one scanned image was recognized by said gateway image processor as belonging to said at least one individual scanned image category, thereby to save processing time of said high-cost authentication functionality by routing a smaller number of scanned images thereto.

10. The system according to claim 1 wherein said system employs a plurality of image authentication stations customized to perform a corresponding plurality of image authentication tasks and wherein all of said stations are unable to process scanned images which do not belong to said individual scanned image category, such that a single gateway image processor is able to filter out scanned images which all of said plurality of image authentication stations are unable to process.

11. The system according to claim 10 wherein said tasks undergo fluctuation over time and wherein said single gateway image processor is operative, independent of said fluctuation, to filter out scanned images which all of said plurality of image authentication stations are unable to process.

12. The system according to claim 1 wherein said filtering comprises determining whether or not blobs in said image are arranged in rows.

13. The system according to claim 1 wherein said filtering comprises determining whether or not entropy of a histogram of said input image's gray level values exceeds a threshold.

14. The system according to claim 1 wherein said gateway image processor is operative for said on-line filtering of an incoming scanned image and for first-line low-cost authentication of said incoming scanned image and wherein said processor is operative to transmit at least one scanned image, to at least one image authentication station comprising a high-cost authentication functionality capable of authenticating incoming scanned images which said first-line low-cost authentication has failed to authenticate, and wherein said interface decides whether or not to route at least one scanned image to said high-cost authentication functionality, at least partly depending on whether or not said at least one scanned image was recognized by said gateway image processor as belonging to said at least one individual scanned image category, thereby to save processing time of said high-cost authentication functionality by routing a smaller number of scanned images thereto.

15. The system according to claim 1 wherein the gateway image processor is operative to receive a scanned image and to determine whether the scanned image falls within these categories: documents the system supports, unsupported documents and everything else; and
accordingly, to provide at least one suitable indication to
at least one of
at least one downstream system, and
directly to an end-user who provided the scanned image.

16. The system according to claim 15 wherein the gateway image processor determines whether the scanned image is a document the system supports by identifying the scanned image as an ID and, if so, routing the ID to ID authentication functionality which identifies the ID routed thereto as one of a plurality of ID document types the system supports.

17. The system according to claim 1 wherein for each "this incoming file is a supported ID document" event, the system performs at least one of the following:
informs an operator all is well, and
performs ID-document-type-specific fraud tests.

18. The system according to claim 1 wherein for each "this incoming file isn't one of our supported ID documents, but it is some sort of ID document" event, the system alerts a human operator that the unrecognized ID document needs to be authorized manually.

19. The system according to claim 1 wherein for each "this incoming file is not even an ID document" event, the system communicates with a remote individual who provided the incoming file and indicates that s/he has erroneously sent in a file which is not an ID document.

20. A system according to claim 1 wherein said category comprises at least one of an ID and a form and wherein said filtering comprises determining whether or not blobs in said image are arranged in rows and comparing entropy of a histogram of said input image's gray level values to a threshold.

21. A scanned image authentication method employing at least one image authentication station which is able to process scanned images which belong to at least one individual scanned image category, the method comprising:
using a gateway image processor for on-line filtering of an incoming scanned image to determine whether or not the incoming scanned image belongs to the scanned image category, and
using a computer-implemented interface to transmit each individual scanned image to the at least one image authentication station for performing authentication of said individual scanned image, only if said gateway image processor has determined that said individual scanned image belongs to said at least one individual scanned image category.

22. The method according to claim 21 wherein said category comprises documents containing text and said filtering comprises discriminating text-containing images from natural images.

23. The method according to claim 22 wherein said filtering also comprises determining whether said text-containing images are images of forms.

24. The method according to claim 22 wherein said filtering also comprises determining whether said text-containing images are ID documents.

25. The method according to claim 21 wherein said category comprises forms and said filtering comprises discriminating forms from non-forms.

26. The method according to claim 21 wherein said category comprises ID documents and said filtering comprises discriminating ID documents from images which are not ID documents.

27. The method according to claim 21 wherein the gateway image processor is operative to receive a scanned image and to determine whether the scanned image is a blank image; and accordingly, to provide at least one suitable indication to at least one of:

at least one downstream system and directly to an end-user who provided the scanned image.

28. The method according to claim 21 wherein the gateway image processor is operative to receive a scanned image and to determine whether the scanned image is an ID document.

29. The method according to claim 21 wherein the gateway image processor is operative to receive a scanned image and to determine whether the scanned image falls within these categories:

at least one of a form image category and an ID image category; and at least one of a natural image category, a blank image category, and an "other" category; and accordingly, to provide at least one suitable indication to at least one of:

at least one downstream system, and directly to an end-user who provided the scanned image.

30. The method according to claim 21 wherein the gateway image processor is operative to receive a scanned image and to determine whether the scanned image falls within these categories: form image, ID image, natural image, blank image, other; and accordingly, to provide at least one suitable indication to at least one of:

at least one downstream system, and directly to an end-user who provided the scanned image.

31. The method according to claim 21 wherein the gateway image processor is operative to receive a scanned image and to determine whether the scanned image falls within these categories: pictures, forms or documents; and accordingly, to provide at least one suitable indication to at least one of at least one downstream system, and directly to an end-user who provided the scanned image.

32. A computer program product, comprising a non-transitory tangible computer readable medium having computer readable program code embodied therein, said computer readable program code adapted to be executed to implement a scanned image authentication method employing at least one image authentication station which is unable to process scanned images which do not belong to at least one individual scanned image category, the method comprising:

using a gateway image processor for on-line filtering of an incoming scanned image to determine whether or not the incoming scanned image belongs to the scanned image category, and using a computer-implemented interface to transmit each individual scanned image to the at least one image authentication station for performing authentication of said individual scanned image, only if said gateway image processor has determined that said individual scanned image belongs to said at least one individual scanned image category.

\* \* \* \* \*